TUNNEL DIODE-SATURABLE REACTOR CONTROL CIRCUIT

Filed June 21, 1960 2 Sheets-Sheet 1

Inventor
Raymond E. Morgan
by Charles W Helzer
His Attorney

TUNNEL DIODE-SATURABLE REACTOR CONTROL CIRCUIT

Filed June 21, 1960 2 Sheets-Sheet 2

Inventor
Raymond E. Morgan
by Charles W. Helzer
His Attorney

United States Patent Office 3,214,604

Patented Oct. 26, 1965

3,214,604

TUNNEL DIODE-SATURABLE REACTOR CONTROL CIRCUIT

Raymond E. Morgan, Schenectady, N.Y., assignor to General Electric Company, a corporation of New York Filed June 21, 1960, Ser. No. 37,631

6 Claims. (Cl. 307—88.5)

The present invention relates to a new and improved electronic control circuit.

More particularly, the invention relates to an electronic control circuit employing a tunnel diode and a saturable reactor as the primary circuit characteristic determining elements to provide a new and improved circuit having a high gain and a wide range of signal output frequencies.

There are a number of applications for industrial electronic control systems where it is desirable that the input and output terminals of the control be insulated from each other, and that the control exhibit certain desirable characteristics such as a wide range of output frequencies and high gain with comparatively small size and low cost.

It is therefore a primary object of the present invention to provide a new and improved control circuit employing a saturable reactor and a tunnel diode which possesses both high gain, and greatly facilitates the development of strong control signals.

Another object of the invention is to provide a new and improved control circuit which permits the use of a relatively small saturable reactor to control a wide range of output frequencies extending down to very low frequency control signals.

A still further object of the invention is to provide a new and improved control circuit which may be adapted readily to have its input terminals insulated from its output terminals for use in certain applications.

In practicing the invention, a control circuit is provided which comprises a tunnel diode and a saturable reactor connected in series circuit relationship across a source of electric potential. In a preferred embodiment of this circuit, the saturable reactor comprises a saturable transformer having its control winding connected to a source of control signals, and having its secondary winding connected in series circuit relationship with the tunnel diode across the source of electric potential. If desired, a source of bias current can be connected directly to the tunnel diode, or a bias winding may be provided to the saturable transformer, and the source of the bias current connected to the bias winding.

Other objects, features and many of the attendant advantages of this invention will be appreciated more readily as the same becomes better understood with reference to the following detailed description when considered in connection with the accompanying drawings, wherein like parts of each of the several figures are identified by the same reference character and wherein.

Figure 1:
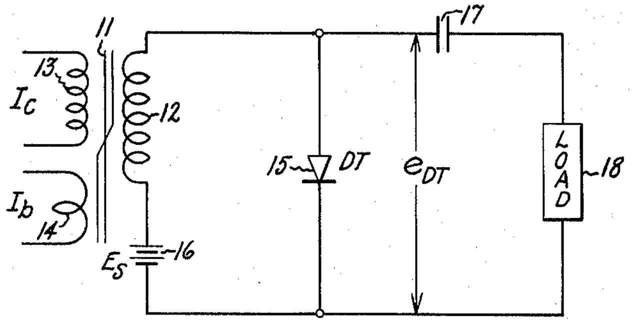
FIG. 1 is a schematic circuit diagram of a new and improved control circuit constructed in accordance with the teachings of the present invention.

The new and improved control circuit shown in FIG. 1 comprises a saturable reactor 11 having a saturable core, and a secondary winding 12 which is inductively coupled to a control winding 13, and to a bias winding 14. The nature and construction as well as the operating characteristics of the saturable reactor 11 is described more fully in a textbook entitled, "Magnetic Amplifiers" by Herbert F. Storm, published by John Wiley & Sons, New York, 1955. The secondary winding 12 of the saturable reactor 11 is connected in series circuit relationship with a tunnel diode 15, the construction and characteristics of which are described in a paper appearing in the Institute of Radio Engineers, WESCON Convention Record, 1959, Part 3, ECG441, pages 9–31, and entitled, "Germanium and Silicon Tunnel Diodes—Design, Operation and Application," by I. A. Lesk, N. Holonyak, Jr., U.S. Davidsohn, and M. W. Aarons, and reference is made to this paper for a more detailed description of the construction and characteristics of the tunnel diode. The series circuit formed by the secondary winding 12 and tunnel diode 15 is connected across a source of electric potential 16 which may comprise a battery, or other direct current power source. The output voltage from the control circuit is obtained across the tunnel diode 15 and is coupled through a coupling capacitor 17 to a load device 18.

Figure 2:
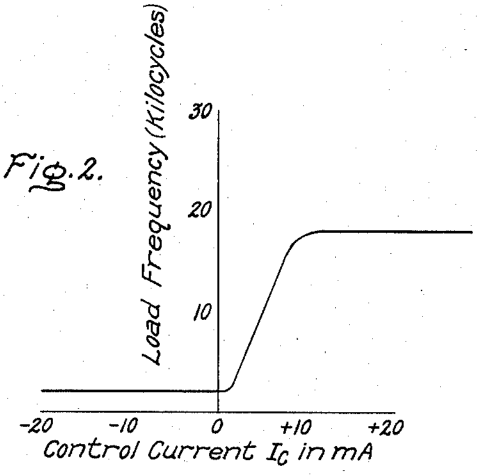
FIG. 2 is a characteristic curve of the control current vs. the load frequency characteristic of the circuit shown in FIG. 1.
Figure 3:
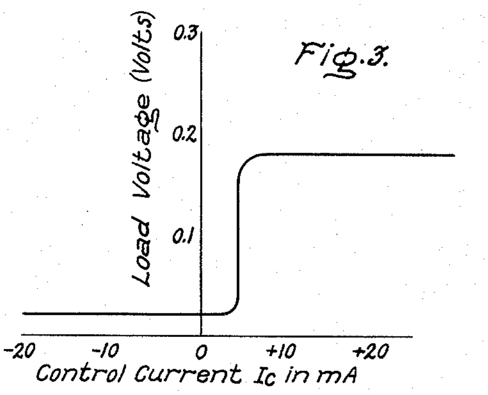
FIG. 3 is a characteristic curve which shows the control current vs. the output voltage in volts of the circuit of FIG. 1.
Figure 4:
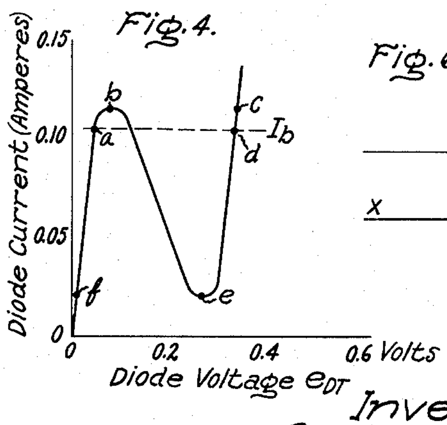
FIG. 4 is a plot of the tunnel diode output voltage vs. the tunnel diode current for a typical tunnel diode, and depicts the operating points passed over during one cycle of the operation of the control circuit.

The operating characteristics of the circuit shown in FIG. 1 are illustrated in FIGS. 2, 3, and 4. FIG. 2 shows the control current $I_c$ plotted against the load frequency output where $I_c$ is a control current supplied to the control winding 13 and the load frequency is the frequency of the output voltage appearing across the tunnel diode 15. From an examination of this characteristic curve it can be appreciated that there is a relatively wide range of frequencies over which the circuit operates for control current values ranging from +2 milliamperes to approximately +8 milliamperes. The control current vs. load voltage output characteristics of the circuit is shown in FIG. 3 of the drawings, and it can be appreciated that a relatively large change in output voltage occurs for minute changes in control current values in the +2 to +8 milliamperes region. The tunnel diode current vs. output voltage $e_{DT}$ characteristic curve of the tunnel diode employed in the circuit, is shown in FIG. 4 of the drawings. From an examination of this characteristic curve, which is typical of all tunnel diodes, it can be seen that for low input current, the diode current increases rather linearly with increasing voltage up to a point *b* where it drops off and exhibits a negative characteristic up to a value of approximately $\frac{3}{10}$ of a volt, and thereafter will again linearly increase with increasing voltage. It is this negative resistance characteristic of the tunnel diode which makes possible the operation of the present control circuit.

Figure 5:
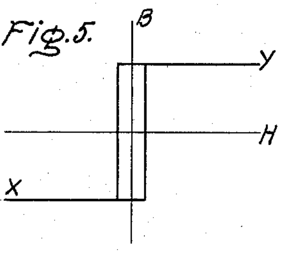
FIG. 5 is a hysteresis curve showing the plot of flux density vs. magnetizing force for the saturable reactor employed in the circuit.
Figure 7:
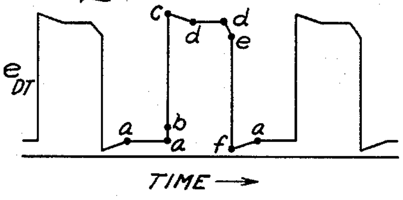
FIG. 7 is a voltage vs. time plot of the output voltage appearing across the output terminals of the control circuit.

For the purpose of the explanation of the operation of the circuit it will be assumed that there is no control current supplied to the control winding 13, and that only a bias current $I_b$ is supplied to the bias winding 14 which operates to bias the tunnel diode 15 up to the point *a*. At this stage of the operation it is assumed that the positive potential from the battery source 16 will drive the core of the saturable reactor 11 up its hysteresis curve shown in FIG. 5 from some point *x* at negative saturation towards positive saturation and will drive the core into positive saturation along line *y* at some time intermediate the points *a* and *b* on the tunnel diode characteristic curve. Thereafter, a current from the battery source 16 will continue to drive the tunnel diode 15 from the point *a* on its characteristic curve up to the point *b*. Upon reaching point *b* on its characteristic curve, the tunnel diode will immediately shift over to point *c* thereby increasing the output voltage across the tunnel diode from a value of about 1/10 of a volt to a value of 4/10 of a volt. This sudden jump or increase in tunnel diode output voltage is of course due to the internal operating characteristics of the tunnel diode as explained more fully in the referenced text describing the tunnel diode device. Upon reaching point *c* on the tunnel diode operating characteristic, the relative values of the output voltage $e_{DT}$ and the supply voltage $E_S$ are such that the tunnel diode output voltage $e_{DT}$ back biases the saturable reactor winding resulting in driving the winding back down its hysteresis loop from positive saturation at *y* to negative saturation at *x*. The interval of time required for the saturable reactor to traverse back down its hysteresis curve from positive to negative saturation corresponds to the interval of time required to decrease the current through the tunnel diode from the value of approximately .12 ampere at point *c* back down its characteristic curve to a value of approximately .02 of an ampere at point *e* where the saturable reactor reaches negative saturation. It is this interval that determines primarily the frequency characteristic of the circuit. Upon reaching point *e* on the characteristic curve of the tunnel diode; however, the tunnel diode will immediately shift from point *e* to point *f* due to its inherent operating characteristics, and thereafter the bias current $I_b$ will return the current level back up the operating characteristic curve of the tunnel diode from the point *f* to the point *a* almost simultaneously. Accordingly, in a cycle of operation, starting at point *a* the saturable reactor will be driven from negative to positive saturation at some point intermediate the two points *a* and *b* on the tunnel diode characteristic so that the saturable reactor will be saturated positively upon the current through the tunnel diode reaching point *b* on its characteristic curve. Upon reaching point *b* the output voltage across the tunnel diode immediately jumps to point *c* where the condition $e_{DT}>E_S$ prevails and the diode back biases the saturable reactor. Thereafter, the reverse voltage across the saturable reactor will drive it back down its hysteresis curve to its negative saturation condition. This occurs simultaneously with the current through the tunnel diode reaching point *e* so that the diode voltage will jump back to point *f* and be returned to *a* by the bias current. The resulting wave form of the output voltage $e_{DT}$ is shown in FIG. 7 of the drawings wherein it can be appreciated that a substantially square wave output potential is produced across the tunnel diode 15 which has a frequency that is determined primarily by the characteristics of the saturable reactor 12. The frequency of this square wave output signal is determined primarily by the time required for the saturable reactor to be driven back down through its major hysteresis loop from positive saturation somewhere along line *y* to the negative saturation along line *x* and thereby tracing out the portion of the tunnel diode characteristic curve from point *c* to point *e*.

Figure 6:
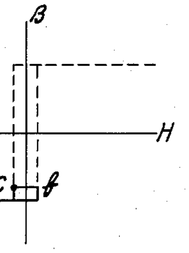
FIG. 6 is a second hysteresis curve illustrating the operation of the saturable reactor in the circuit of FIG. 1.

The provision of a control current $I_c$ to the control winding 13 provides a measure of control over the frequency of the square wave output signal by controlling the degree to which the saturable reactor is driven from negative saturation towards positive saturation. The provision of a control current $I_c$ to the control winding 13 may be accomplished by a pulse current having a repetition rate identical to that at which it is desired that the circuit operate, and hence identical to the frequency to the square wave output voltage to be produced by the circuit. In another embodiment of the invention to be described later, the control current may be a steady state value having an adjustable magnitude. The effect of the control current on the tunnel diode characteristic is to drive the tunnel diode from point *a* on its characteristic curve to point *b* on its characteristic curve at a much more rapid rate than would otherwise be the case if only the source of potential $E_s$ and the bias current $I_b$ were relied upon to achieve this end. Upon reaching point *b* on the tunnel diode characteristic curve, the tunnel diode will immediately shift to its point *c* and thereby place a back bias on the winding 12 of the saturable reactor 11 as described. The result of this sudden shift at point *b* during the magnetization of the core of the saturable reactor 12 is to immediately shift the direction of magnetization of the core over to the point *c* on its hysteresis curve as shown in FIG. 6 of the drawings. Hence, in traversing from point *c* to *e* on the characteristic curve of the tunnel diode, the current through the diode need only drive the core of the saturable reactor from point *c* down into negative saturation at point *x* thereby tracing out only a minor hysteresis loop rather than the entire major hysteresis loop of the core. As a consequence, the tunnel diode can be driven from point *c* on its characteristic curve back to point *e* at a much more rapid rate thereby increasing the frequency of the square wave output signal appearing across the output terminals of its tunnel diode. It can be appreciated of course that by varying the value of the control current $I_c$ supplied to the control winding 13 a greater or smaller minor hysteresis loop *xbc* can be traced out in a cycle of operation thereby varying the frequency of the output signal over the range indicated in FIG. 2 of the drawings. From the above description, it can be appreciated that the invention makes available a new and improved control circuit capable of providing a square wave output voltage over a wide range of frequencies, and which is relatively simple and inexpensive to construct in comparison to some existing control circuits adapted for the same end.

Figure 8:
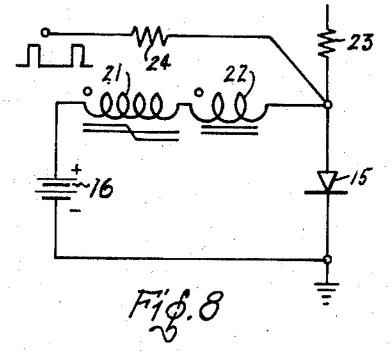
FIG. 8 is a schematic circuit diagram of a modified version of a control circuit constructed in accordance with the present invention.

A second embodiment of a control circuit constructed in accordance with the present invention is shown in FIG. 8 of the drawings. The control circuit shown in FIG. 8 includes a tunnel diode 15 which is connected in series circuit relationship with a saturable reactor 21 whose saturated inductance is represented by a second linear inductor 22. The series circuit thus formed is connected across a source of electric potential 16 which may comprise a battery or other direct current electric source. A source of bias current, not shown, is connected directly to the collector electrode of the tunnel diode 15 through a resistor 23, and a source of control signals, not shown, which may comprise a pulse wave form or a steady state control signal, is connected through a second resistor 24 to the collector electrode of the tunnel diode 15. The tunnel diode 15 will have the same characteristic curve as is illustrated in FIG. 4 of the drawings and since it has a bias current supplied thereto through the resistor 23 it will be biased to operate in precisely the same fashion as the circuit arrangement of FIG. 1. This is particularly true if the control signal supplied to the resistor 24 to tunnel diode 15 is a pulsed signal. The arrangement of FIG. 8 however does allow a direct current control signal of varying magnitude to be supplied through the resistor 24 to the tunnel diode 15. This in effect would be the same as increasing the bias current $I_b$ to cause the bias point *a* to shift up on the tunnel diode characteristic to the point *b*, and would have the corresponding effect of increasing the pulse repetition frequency of the square wave output signal produced by the circuit across the tunnel diode 15. In all other respect, the circuit would operate in identical fashion to the mode of operation described with relation to the circuit shown in FIG. 1. By varying the value of the direct current control signal supplied through the resistor 24 to tunnel diode 15, it would of course be possible to back off the bias value to some intermediate point between the points *a* and *b* on the tunnel diode characteristic curve so as to decrease its frequency of operation thereby allowing the range of output frequencies shown in FIG. 2 of the drawings to be produced.

Figure 9:
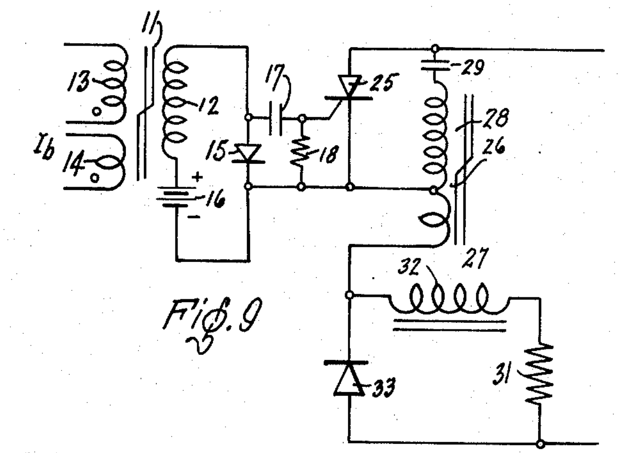
FIG. 9 is a schematic circuit diagram of still a third form of control circuit constructed in accordance with the invention, and illlustrates a control circuit suitable for use as a preamplifier of a subsequent power amplifier stage in a power control system.

Still another form of a new and improved control amplifier constructed in accordance with the invention is shown in FIG. 9 of the drawings. The control amplifier shown in FIG. 9 includes a new and improved tunnel diode saturable reactor control circuit formed by a saturable reactor 11 having a control winding 13, and bias winding 14 inductively coupled to a secondary winding 12. The secondary winding 12 is connected in series circuit relationship with a tunnel diode 15 across a source of electric potential 16 which may comprise a battery or other direct current power source. The control circuit thus comprised is identical to that shown in FIG. 1 of the drawings, and operates in an identical fashion to provide a square wave output potential that is applied through a coupling capacitor 17 across a load resistor 18.

The square wave signal pulses appearing across the load resistor 18 are applied to the control gate element of a silicon controlled rectifier 25. The silicon controlled rectifier is PNPN semiconductor consisting of three rectifying junctions which is manufactured and sold commercially by the General Electric Semiconductor Products Department and is described in the publication entitled, "Controlled Rectifier Manual," available from the above identified department of the General Electric Company. The silicon controlled rectifier 25 comprises a part of the proportional control power amplifier stage that further includes a second saturable reactor 26 having a primary winding 27 and a secondary winding 28 which are inductively coupled. The secondary winding 28 is connected to one terminal of a charging capacitor 29 and the remaining terminal of the charging capacitor 29 is connected to the collector electrode of the silicon controlled rectifier and to the positive terminal of a source of direct current electric potential. The primary winding 27 of the saturable reactor 26 is connected to a load device 31 through a filter circuit comprised by an inductance 32 and a diode 33. The proportional control power amplifier thus comprised, is described more fully in a copending application entitled, "Proportional Power Amplifier," R. E. Morgan, inventor, filed August 12, 1959, application Serial No. 833,292, now United States Patent No. 3,019,355, issued January 30, 1962. For a more detailed description of the operation of the proportional power amplifier, reference is made to the above identified copending application. Briefly, however, the saturable reactor 26 serves to charge the charging capacitor 29 to a voltage about twice that of the direct current power source connected to the power amplifier during the period when the controlled rectifier 25 is conducting. Upon reaching saturation, the impedance of the secondary winding 28 becomes practically negligible so that the charge on the charging capacitor 29 is connected directly across the controlled rectifier and serves to quench or cut off conduction to the rectifier. Accordingly, the saturable reactor-capacitor combination serves to commutate the rectifier and return it to its blocking condition.

In operation, the new and improved saturable reactor-tunnel diode control circuit serves to develop a square wave output signal which is applied as a gating signal to the control gate element of the control rectifier to turn on the control rectifier 25. Thereafter, the commutating circuit comprised by the second saturable reactor 26 and charging capacitor 29 function to turn off the rectifier. The frequency with which the gating signals are supplied to the control gate of the silicon controlled rectifier 25 of course determines the frequency of operation of the proportional control power amplifier and hence. the power supplied to the load 31. By varying this frequency, the power supplied to the load device 31 is varied proportionally.

Figure 10:
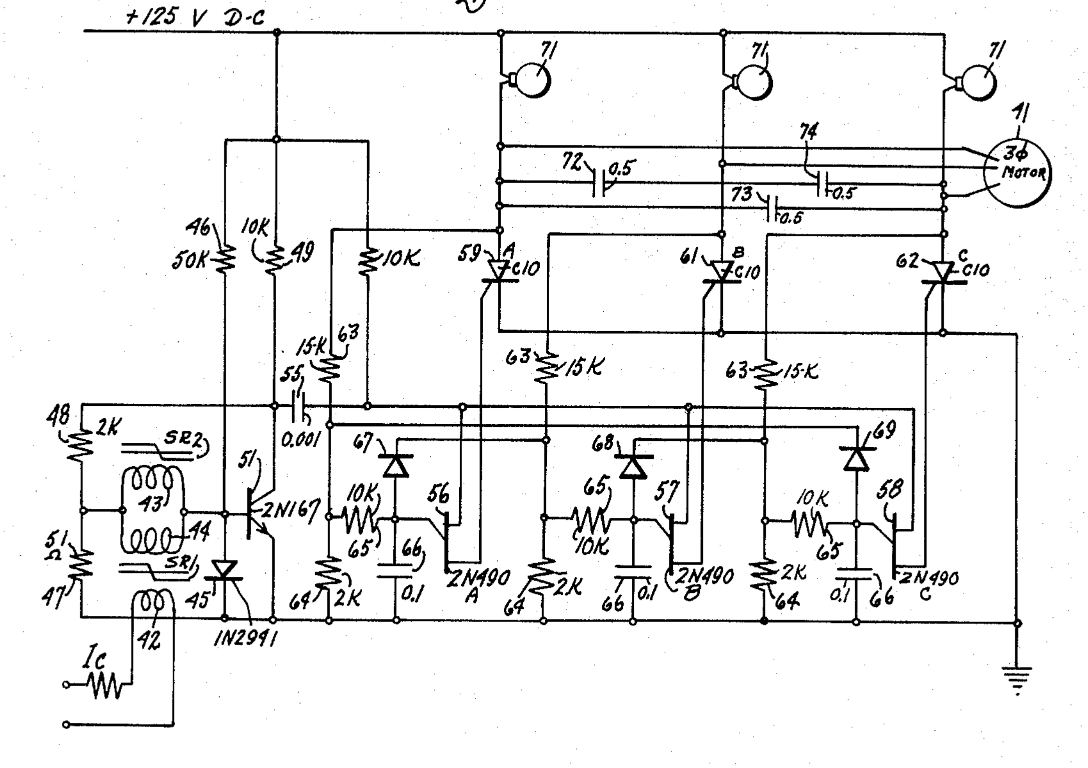
FIG. 10 is a schematic circuit diagram of a speed control system which employs a novel control circuit constructed in accordance with the invention as an element thereof.
Figure 11A:
FIGS. 11*a* and 11*b* are the speed vs. control current characteristics for two forms of the system shown in FIG. 10.
Figure 11B:
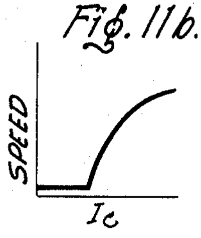

FIG. 10 of the drawings discloses a motor speed control system which incorporates the novel tunnel diode-saturable reactor control circuit as a part thereof, and further includes a new and improved unijunction-transistor shift register which comprises a part of the present invention. The speed control system is adapted to control the speed of a motor 41 through a wide range of frequencies extending down to an extremely low speed. The system includes a saturable reactor-tunnel diode control circuit formed by a saturable transformer having a control winding 42 inductively coupled to a pair of saturating secondary winding 43 and 44. The secondary windings 43 and 44 are connected in parallel circuit relationship, and if desired, only a single secondary windings may be employed. The parallel secondary windings 43 and 44 are connected in series circuit relationship with a tunnel diode 45 which has its emitter electrode connected directly to ground, and its collector electrode connected through a biasing resistor 46 to a 125 v. direct current source of bias potential. The series circuit formed by the secondary windings 43, 44 and the tunnel diode 45 are connected across a source of electric potential $E_s$ comprised by one arm of a voltage dividing network formed by a resistor 48 and resistor 49 connected in series circuit relationship between ground and the 125 v. direct current source of potential. In operation, the saturable reactor-tunnel diode control circuit will function in precisely the same manner as the circuit shown in FIG. 1 of the drawings to develop a variable frequency, square wave output control signal whose output frequency is determined by the value of the control current $I_c$ supplied through the control winding 42. The inclusion of one or two secondary saturable windings 43 or 44 in the circuit will determine the precise speed vs. control current characteristic of the circuit as illustrated in FIGS. 11*a* and 11*b* of the drawings. In the event that both secondary windings 43 and 44 are used in the circuit, the control circuit will possess the characteristic illustrated in FIG. 11*a* of the drawings where the speed will arise approximately linearly from zero control current as the control current increases. However, in the event that only one secondary winding 43 or 44 is employed in the control circuit, the circuit will possess the characteristic shown in FIG. 11*b* of the drawings wherefor the lower values of the control current $I_c$, the speed will remain approximately constant up to a medium value of control current $I_c$ and thereafter increase approximately linearly in the manner illustrated. Whether one or two secondary windings 43 or 44 will be used is of course dependent upon the type of speed control characteristic which it is desired that the circuit possess.

The square wave control voltage appearing across the tunnel diode 45 is applied to the base electrode of an NPN transistor amplifier 51. The output of the NPN transistor 51 is coupled through a coupling capacitor 55 to the base electrodes of the three unijunction transistors 56, 57, and 58. The three unijunction transistors 56, 57, and 58 comprise a part of a novel unijunction transistor shift register which forms a part of the motor speed control system. Each of the unijunction transistors has its remaining base electrodes connected directly to the control gate element of a respective associated silicon controlled rectifier 59, 61, and 62 which also comprise parts of the speed control system. The emitter elements of each of the unijunction transistors 56–58 are connected to a respective associated triggering circuit, and since each of the triggering circuits connected to the unijunction transistors 56–58 is identical in construction and operation, only one will be described. The triggering circuits are comprised by a voltage dividing network connected between the source of 125 v. direct current and ground and is formed primarily by a pair of series connected resistors 63 and 64. The junction of the two resistors 63 and 64 is connected through a filter circuit comprised by a resistor 65 and capacitor 66 to the emitter element of the respective associated unijunction transistor. The emitter element of each unijunction transistor 56–58 is also interconnected back directly through a clamping diode 67, 68, or 69, respectively, to the junction of the biasing resistors 63 and 64 of the preceding stage. The function of these clamping diodes will become more apparent in connection with the explanation of the operation of the shift register.

With respect to the silicon controlled rectifiers, the collector electrodes of each of these rectifiers are connected through a respective associated indicating lamp 71 to the positive terminal of the 125 v. direct current source, and the emitter electrode of each controlled rectifier is connected directly to ground. In addition the collector electrodes of each of the controlled rectifiers are intercoupled through intercoupling capacitors 72, 73, and 74, respectively, and output currents from the controlled rectifiers are supplied through direct connections to the motor windings of the motor 41 being controlled.

In considering the operation of the speed control circuit shown in FIG. 10 assume that the controlled rectifier 62 is conducting by reason of a positive firing potential applied to its gate element from a suitable starting circuit connected to the gate element of controlled rectifier 62. In the event the terminals of the two capacitors 73 and 74 connected to this controlled rectifier will be effectively grounded so that these capacitors in conjunction with the two lamps 71 comprise a voltage divider for applying enabling potentials back to the biasing resistors 63 and 64 of the remaining two unijunctional transistors 67 and 68 thereby enabling these transistors. Upon the occurrence of a voltage pulse in the square wave output signal supplied from the saturable reactor-tunnel diode control circuit through the coupling capacitor 55, enabling potentials will be applied to the base elements of the two unijunction transistors 56 and 57 as well as to the unijunction transistor 58. This enabling potential will have no effect on the unijunction transistor 58, however, due to the fact that the bias circuit comprised by the series resistors 63 and 64 connected to this transistor is effectively grounded through the conducting controlled rectifier 62. Likewise, this enabling pulse will have no effect on the unijunction transistor 57 due to the fact that the clamping diode 68 will effectively clamp the emitter element of this diode to ground potential through the resistor 63 of the unijunction transistor stage 58 and the conducting controlled rectifier 62. Consequently, only the unijunction transistor 56 will be rendered conductive by the enabling pulse supplied by the tunnel diode-saturable reactor control circuit thereby applying a gating signal to the gate control element of the silicon controlled rectifier 59. This results in turning on the controlled rectifier 59 to produce an output current flow through its output conductor that is applied to the field windings of the motor 41. Concurrently, the charge built up across the intercoupling capacitor 73 will be reversely applied across the controlled rectifier 62 and will serve to quench this rectifier hereby turning it off, and returning it to its blocking conditions. Succeeding triggering pulses from the saturable reactor-tunnel diode control circuit will have the same effect on each of the unijunction transistors gating circuits in sequence so that the unijunction phase shift register effects a three to one division in repetition rate of the current pulses supplied to the motor 41. This three to one division together with the wide range in frequency of the output pulses obtainable from the saturable reactor-tunnel diode control circuit, provides an extremely wide range in frequency of the speed control signals that are applied to the motor 41. A particular advantage of this arrangement is that it allows the range of speed control signals to extend to extremely low frequency levels which are much lower in value than any of these heretofore obtainable with comparable size circuit components.

From the foregoing description, it can be appreciated that the invention provides an extremely high gain and yet simple and inexpensive to construct control circuit which employs a saturable reactor and tunnel diode in combination. This particular circuit combination permits the use of very small saturable reactors to control a wide range of frequencies, and allows the range of frequencies produced by the control circuit to extend down to very low values for a given size reactor. Additionally, an advantage of the circuit is that it allows insulated input and output terminals to be used where desired, and this is an extremely valuable feature in certain applications.

Having described several embodiments of a new and improved control circuit constructed in accordance with in invention, it is believed abvious that other modifications and variations of the present invention are possible in the light of the above teachings. It is, therefore, to be understood that changes may be made in the particular embodiments of the invention described which are within the full intended scope of the invention as defined by the appended claims.

What I claim as new and desired to secure by Letters Patent of the United States is:

1. A variable frequency control circuit comprising a saturable reactor having positive and negative saturation magnetization conditions, a tunnel diode and a source of direct current electric potential, said saturable reactor and said source of direct current electric potential being connected in series circuit relationship across said tunnel diode, means to provide a direct current control signal of varying magnitude to the circuit thus comprised for causing the current excursions of the tunnel diode to drive the saturable reactor through different characteristic minor hysteresis loops for different frequencies of operation, and means for operatively coupling a load to said circuit for deriving a variable frequency control signal therefrom.

The combination set forth in claim 1 wherein the voltage of the source of electric potential is intermediate the low and high voltage values of the output voltage versus current characteristic of the tunnel diode.

2. The combination set forth in claim 1 wherein the voltage of the source of electric potential is intermediate the low and high voltage values of the output voltage versus current characteristic of the tunnel diode.

3. The combination set forth in claim 1 wherein said saturable reactor comprises a saturable transformer having an inductively coupled control winding and secondary winding with the secondary winding being connected in series circuit relationship with the tunnel diode, and the control winding being connected to a source of direct current control signals having a varying magnitude.

4. The combination set forth in claim 1 further characterized by a source of bias current connected to said tunnel diode.

5. The combination set forth in claim 1 wherein said saturable reactor comprises a saturable transformer having an inductively coupled control winding and secondary winding with the secondary winding being connected in series circuit relationship with the tunnnel diode, and the control winding being operatively coupled to a source of direct current control signals having a varying magnitude, and a source of bias current operatively coupled to said tunnel diode.

6. A control circuit comprising a tunnel diode and a saturable reactor connected in series circuit relationship across a source of direct current operating potential having a voltage which is intermediate the low and high voltage values of the output voltage versus current characteristic of the tunnel diode, said saturable reactor comprising a saturable transformer having an inductively coupled bias, control and secondary windings with the secondary winding being connected in series circuit relationship with the tunnel diode, the control winding being conected to a source of direct curret control signals having a varying magnitude, and the bias winding being connected to a source of bias current, the saturable reactor being fabricated in a manner related to the tunnel diode characteristics such that the current excursions of the tunnel diode drive the saturable reactor between its positive and negative magnetization saturation conditions only at some fixed base frequency of operation, and the same current excursions of the tunnel diode drive the saturable reactor through different characteristic minor hysteresis loops for different frequencies of operation.

References Cited by the Examiner

UNITED STATES PATENTS

| | | | |
|---|---|---|---|
| 2,909,659 | 10/59 | Woo | 328—31 |
| 2,951,951 | 9/60 | Morgan | 307—88.5 |
| 2,967,250 | 1/61 | Druker et al. | 307—88.5 |
| 2,975,377 | 3/61 | Price et al. | 307—88.5 |
| 2,981,849 | 4/61 | Gobat | 307—88.5 |
| 2,987,666 | 6/61 | Manteuffel | 328—32 |
| 2,988,653 | 6/61 | Samusenko | 307—88.5 |
| 2,997,604 | 8/61 | Sockley | 307—88.5 |
| 3,062,971 | 11/62 | Wallace | 307—88.5 |
| 3,070,708 | 12/62 | Dill | 307—88 |

ARTHUR GAUSS, *Primary Examiner.*

GEORGE N. WESTBY, JOHN HUCKERT, *Examiners.*